3,076,830
VANADIUM COMPOUNDS
John B. Conn, Westfield, N.J., assignor to Merck & Co., Inc., Rahway, N.J., a corporation of New Jersey
No Drawing. Original application Apr. 29, 1959, Ser. No. 809,591. Divided and this application Jan. 26, 1960, Ser. No. 9,665
5 Claims. (Cl. 260—429)

This invention relates to inhibition of cholesterol synthesis in mammals and provides a novel compound, methods of preparation of compounds, novel compositions and methods for treatment of mammals to inhibit cholesterol synthesis thereby. This application is a division of application S.N. 809,591 filed April 29, 1959.

Cholesterol synthesis may occur in some mammals as an incident of normal body functions and also occurs in mammals as an incident of abnormal conditions such as the existence of tumors. The inhibition of the synthesis is often desirable, particularly where it is occasioned by an abnormal condition, and for this purpose the use of vanadium has been proposed. The introduction of vanadium in a convenient manner to provide it at the site of the synthesis, without undesirable side effects, presents a problem and it is a principal object of the invention to provide for the suitable introduction of the material.

It has been found that the synthesis can be inhibited by orally administering to a mammal capable of acting as a host for the synthesis a water soluble material including a complex of an organic acid residue and an oxo-vanadium group in which the valence of vanadium is 4 or 5. The vanadium is absorbed in the gut. Attempts to obtain absorption in the gut from simple vanadium compounds such as vanadyl sulfate and sodium metavanadate were not successful.

Materials included among those proposed for use according to the invention are salts having as an anion a complex of an oxo-vanadium group in which the valence of vanadium is 4 or 5 and an organic acid residue derived from an α- or β-hydroxy acid or thioacid. Representative acids are glycollic, thioglycollic, lactic, hydraulic malic, and thiomalic. Representative formulae for anionic complexes formed from these acids are:

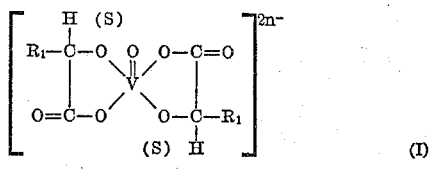
(I)

and

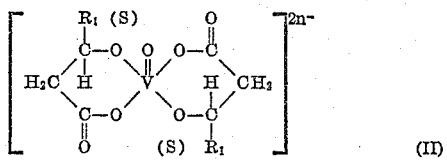
(II)

where $R_1$ is hydrogen, alkyl, aryl carboxy or carboxy substituted alkyl, and the $R_1$'s can be alike or different, and the notation (S) indicates that the adjacent oxygen atom (—O—) can be present in the complex as such or can be replaced by divalent sulfur.

Other α- or β-hydroxy acids which are operable to provide anionic complexes are oxalic, salicylic, thiosalicylic, malonic and citric. Complexes formed from these acids can have structural formulae as is indicated above by Formulae I and II. A preferred acid of the group α- or β-hydroxy acids is tartaric. With tartaric acid, the mol ratio of the oxo-vanadium group and the tartaric acid residue can be, and preferably is, unity.

Other materials of the type referred to are salts having as a cation a complex of an oxo-vanadium (IV) group and an organic acid residue derived from an amino α- or β-alkylthioacid. Representative of these acids is S-benzylcysteine, and representative formulae are

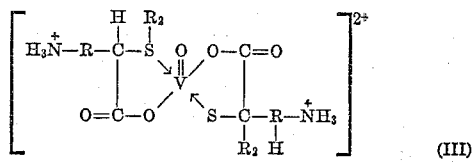
(III)

and

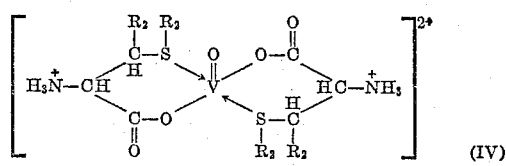
(IV)

wherein $R_2$ is hydrogen, alkyl or aryl and the $R_2$'s can be alike or different.

Other materials among those referred to are zwitterionic complexes of oxo-vanadium (IV) and an acid residue of an amino α- or β-hydroxyacid or thioacids. Representative acids are serine, cysteine, and aminosalicylic acid, and representative formulae are:

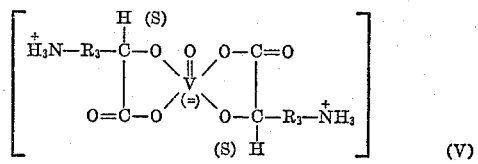
(V)

and

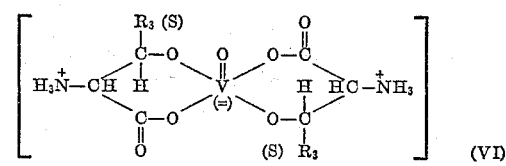
(VI)

wherein $R_3$ is hydrogen, alkyl or aryl and the $R_3$'s can be alike or different, and the notation (S) has the meaning assigned thereto hereinbefore.

Other materials among those referred to are compounds of the oxo-vanadium (IV) group and an organic acid residue derived from an alkylthioacid, for example S-methylthioglycollic acid or S-methylthiosalicylic acid. A representative formula for these materials is

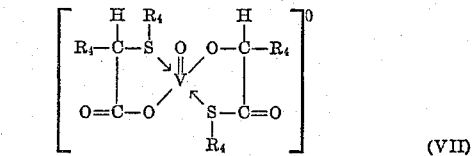
(VII)

wherein $R_4$ is alkyl or aryl, and the $R_4$'s can be alike or different.

Where the complex is the cation, the anion can be the chloride or other physiologically innocuous anion, and in the zwitterionic materials, other physiologically innocuous ions can replace the ammonia ion.

Regarding organic acid residues present in ammonia complexes according to the invention, oxalic and malonic acid which are representative of lower aliphatic decarboxylic acids operative according to the invention, are herein considered to be α- and β-hydroxy acids, respectively, since the hydroxy group in the α- or β-position is functionally the same as the hydroxy group in the α- or β-position of acids such as lactic and hydracrylic acid.

A water soluble salt, for example the ammonium, sodium or potassium salt, having as its anion-oxo-tartrato-vanadate (IV), is suitable for cholesterol synthesis inhibition according to the invention. Thus, the following compound is suitable:

Diammonium oxy-tartratovanadate (IV) of formula:

$$(NH_4)_2[VO(C_4H_2O_6)] \qquad (5)$$

Examples of other compounds within the scope of the above description are:

Triammonium dioxy - bis - oxalatovanadate (V) of formula:

$$(NH_4)_3[VO_2(C_2O_4)_2] \qquad (1)$$

Diammonium dioxy-tris-oxalatodivanadate (IV) of formula:

$$(NH_4)_2[V_2O_2(C_2O_4)_3] \qquad (2)$$

Diammonium oxy-bis-oralatovanadate (IV) of formula:

$$(NH_4)_2[VO(C_2O_4)_2] \qquad (3)$$

Diammonium oxy-bis-malonatovanadate (IV) of formula:

$$(NH_4)_2[VO(C_3H_2O_4)_2] \qquad (4)$$

Diammonium oxy-bis-salicylatovanadate (IV) of formula:

$$(NH_4)_2[VO(C_6H_4OCO_2)_2] \qquad (6)$$

Oxo-bis-(p-aminosalicylato) vanadium (IV) (8)

The structural formula for compound (8) is set forth hereinafter.

In complexes according to the invention, variation in the mol ration of the oxo-vanadium group and the organic acid residue is possible. This will be apparent when the Formulae 1, 2 and 3, above are considered.

The invention provides as a novel compound, oxo-bis-(p-aminosalicylato) vanadium (IV) which has the following structural formula:

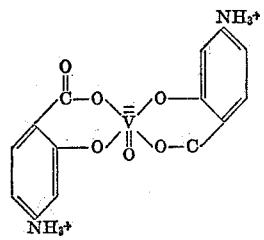

This novel compound is zwitterionic and offers interesting possibilities for use in inhibiting cholesterol synthesis according to the invention.

The novel zwitterionic compound of the above structural formula can be made by reacting p-amino-salicylic acid with a vanadyl salt of an organic acid. An aqueous medium is preferred for the reaction. Other liquid mediums in which the reactants are suitably soluble can be employed. The acid from which the vanadyl salt is derived can be any organic acid providing the salt as soluble in the reaction medium. The salt can be derived from an aliphatic acid, for example a lower aliphatic acid having 2 to 4 carbon atoms. The acetate salt is preferred. Reaction time, temperature and pressure are not critical. The proportion of reactants is not critical and can be stoichiometric, i.e. two moles per mol of salt.

The novel compositions of the invention comprise the water soluble materials described above in combination with a physiologically acceptable carrier such as those commonly used in pharmacy. The resulting compositions can be compounded into unit-dosage forms suitable for use in the manner of the invention. For example, tablets, capsules, pills, suspensions and powders, containing any suitable concentration of the active ingredient can be employed. Such compositions can contain a mere trace of the active ingredient but for practical treatment is is desirable to use compositions containing at least 0.05% by weight and up to 100% by weight of the active ingredient. Desirably, unit-dosage forms contain from about 10 to 50 milligrams, and preferably from about 20 to 30 milligrams per unit. The water-soluble medicinal materials can be incorporated in animal feeds for veterinary use.

Suitable solid carriers are sugar, talc, alginic acid and starch. Lubricants, binders, and coating agents commonly used in the art can be employed in formation of tablets. A suitable combination of inerts for tableting is lactose, talc, and magnesium stearate. Gelatin capsules, powder mixtures, or liquid unit dosages can also be used. A suitable liquid unit is a water solution of the active ingredient. Techniques well known in the art can be employed for the formulation of unit dosages.

The invention provides a novel and improved method for the production of compound (5), i.e. diammonium oxo-tartratovanadate (IV), and this method can be employed for the production of related compounds. Thus, according to the invention, there can be produced a water-soluble vanadium (IV) salt having as its anion a complex of an oxy-vanadium group in which the vanadium is vanadium (IV), such as is indicated by structural Formulae I and II above, and an organic acid residue of the organic acids α- and β-hydroxy acids and thioacids e.g. organic acid residues such as are indicated by structural Formulae I and II above. These acids contain at least two functional groups which are bonded to different carbon atoms and include a carboxyl group and a second carboxyl group or a hydroxyl group. Suitable acids are those mentioned above as being contained in anionic complexes of the invention. The vanadium (IV) salts can be made by a two step process. In the first step hydrazine, hydroxylamine, or a hydrazine derivative containing an amino group, an organic acid, and a metavanadate salt are admixed and the vanadyl salt of the organic acid is formed. In the second step this salt is admixed with a base of the vanadium (IV) salt to be produced and an α- or β-hydroxy acid, and the desired vanadium (IV) salt is formed.

The first step of the method is preferably carried out in an aqueous medium and at a slightly elevated temperature, e.g. 60–70° C. While solvent mediums other than water can be employed, as a practical matter water is preferred. Other suitable mediums are aqueous methanol, ethanol or glycols. Desirably, to assure completion of reaction, about twice the theoretical amount of the acid and hydrazine or other amine compound is employed. During the reaction, nitrogen is evolved and termination of evolution of nitrogen can be conveniently used to signal the end of the reaction. The metavanadate salt can be added gradually to the reaction medium containing the amine compound and organic acid so that evolution of nitrogen is gradual.

The vanadyl compounds produced by the first step are a convenient source for other vanadyl compounds so that the first step of the method has usefulness beyond combination thereof with the second step of the method.

The second step can be carried out by adding to the reaction product of the first step the base and acid employed as reactants in the second step. The amount of acid reactant and base can be the theoretical amount, i.e. the stoichiometric equivalent of the vanadyl salt produced in the first step and of the metavanadate salt used in the first step. The temperature for the reaction is not critical and can be room temperature to about 60° C.

The steps of the method each involve rapid reactions and a distinctive feature of the method of the invention is the speed of the reactions involved, particularly the speed of the second step. The reactions go to completion. Preferably, the reactions of the first and second step are carried out separately by permitting the reaction of the first step to go to completion before commencing the second step.

The vanadium (IV) salts can be recovered from the reaction product of the second step by evaporation whereupon crystals of the product are formed. Desirably, if evolution of acid is detected, by for example, odor, additional base of the vanadium (IV) salt to be produced should be added to suppress the evolution. The crystals can be washed with methanol to remove ammonium acetate, and then they can be dried.

The crystals can be hydrates containing varying amounts of water depending on the particular compound produced and the extent of the drying.

In a preferred embodiment of the invention, a lower aliphatic alcohol such as methanol, ethanol, or isopropanol, is added to the second step reaction product and functions as a precipitant causing crystallization of the vanadium complex. By working up the product in this manner, fine crystals are obtained and these are suitable, as such, for tableting, e.g. combination with carriers and formation into tablets. When an alcohol is not employed, the crystals obtained are large and size reduction by, for example grinding, is required, in order to adapt them for use in making tablets.

Concerning materials suitable for use in the two-step method, in the first step, any organic acid can be employed. The organic acid should be soluble in the reaction medium and when water is employed, the acid is preferably a weak, lower aliphatic, water soluble acid such as a carboxylic aliphatic acid containing from about 2 to 4 carbon atoms. Acetic acid and propionic acid are suitable. Acetic acid is preferred.

The metavandate salt is preferably one whose base is the same as the base of the vanadium (IV) salt produced in the second step. Thus, where diammonium oxo-tartratovanadate (IV) is produced, ammonium metavanadate is preferably employed. The salt can be organic or inorganic and should be soluble in the reaction medium.

The preferred amino compound is hydrazine. Other suitable compounds are hydroxylamine and hydrazine derivatives containing an amino group, for example alkyl hydrazines in which one of the hydrazine nitrogens is unsubstituted. A lower alkyl hydrazine such as methyl hydrazine can be used.

As indicated above, suitable α- and β-hydroxy acids are the following: oxalic, malonic, tartaric, salicylic, lactic, citric, glycollic, thioglycollic, thiosalicylic, hydracrylic, malic and thiomalic.

The base employed in the second step corresponds with the base of the vanadium (IV) salt to be produced. The latter compound, when employed for inhibition of cholesterol synthesis according to the invention, is water soluble and can include as its base ammonia, sodium, or potassium or other base suitable to provide the water soluble vanadium (IV) salts and which is physiologically innocuous. Thus, the base employed as a reactant in the second step can be the hydroxides or carbonates of ammonia, sodium or potassium.

In a preferred embodiment of the invention, the two-step method is employed for the production of diammonium oxo-tartratovanadate (IV). Ammonium metavanadate and acetic acid are employed in the first step and tartaric acid is employed in the second step. The reactions are indicated by the following equations:

4NH$_4$VO$_3$+12HOAc+N$_2$H$_4$→
        4VO(OAc)$_2$+4NH$_4$OAc+8H$_2$O+N$_2$
VO(OAc)$_2$+H$_2$(C$_4$H$_4$O$_6$)+4NH$_3$→
        (NH$_4$)$_2$[VO(C$_4$H$_2$O$_6$)]+2NH$_4$OAc

EXAMPLE I

A mixture of 360 ml. glacial acetic acid, 640 ml. water, and 20 ml. commercial 85% hydrazine hydrate was placed in a 2 liter beaker which was mounted on the steam cone. The mixture was heated to 65° C. under stirring, and 117 g. (1 mole) ammonium metavanadate was gradually added. The solid dissolved to a deep blue solution of oxo-vanadium (IV) acetate, with evolution of nitrogen and heat. When all solid was in solution and evolution of nitrogen had ceased, 150 g. (1 mole) tartaric acid was introduced, followed by 450 ml. 20% ammonia water. The solution now became purple. The solution was transferred to an evaporating dish and concentrated on the steam cone; purple crystals soon began to separate. Whenever, during the evaporation, any odor of acetic acid was noted, more ammonia was added. First crop 193 g.; second crop 37 g. (total 230 g.—86% as

Analysis for C$_4$H$_{10}$N$_2$O$_7$V.H$_2$O, F.W. 267.11.—Calcd.: C, 17.96; H, 4.53; N, 10.49. Found: C, 18.24; H, 4.50; N, 10.73.

Diammonium oxo-tartratovanadate (IV) has been found to be effective to inhibit cholesterol synthesis by brain tumors in man. The drug has been administered orally in doses of 50 to 75 mg. daily. Urinary levels of 200 meg./24 hours are obtained after a few days and this suggests the drug is cumulative and that maintenance dosage for prolonged administration may be lower. Such treatment when extended over a period of 2–8 weeks, results in significant lowering of cholesterol synthesis by brain tumors as evidenced by blood analysis. No toxicity was observed.

The compounds (1) to (4) and (6) above, can be produced by known methods.

EXAMPLE II

Preparation of Oxo-Bis-(p-Aminosalicylato) Vanadium (IV)

To a solution of 180 ml. glacial acetic acid and 10 ml. 85% hydrazine hydrate in 1 l. distilled water was added 58.5 g. (0.5 mole) ammonium metavanadate as in previous example. To the hot solution of vanadyl acetate thus obtained, there was next added 153 g. (1 mole) p-aminosalicylic acid all at once, with rapid stirring. The p-aminosalicylic acid dissolved at first, but in a few seconds the solution became dark-colored, and a purple, crystalline, insoluble solid rapidly separated. The suspension was cooled, filtered, and the solid was thoroughly washed with distilled water, after which it was dried in a desiccator. The purple solid underwent efflorescence during drying, reverting to a blue-gray powder; it is apparently an unstable hydrate. Yield, 177 g. analysis refers to the anhydrous compound, obtained by drying in vacuo.

For C$_{14}$H$_{12}$N$_2$O$_7$V, F.W. 371.20:

|  | Calc. | Found |
|---|---|---|
| C | 45.28 | 44.70 |
| H | 3.26 | 3.80 |
| N | 7.55 | 7.58 |
| Drying Loss, percent |  | 13.8 |

The compound is insoluble in water, but soluble in either dilute acid or base.

What is claimed is:
1. The method of producing a water-soluble vanadium (IV) salt having as an anion a complex of an oxo-vanadium group having the vanadium in the tetravalent state with an organic acid residue derived from an organic complexing acid selected from the group consisting of glycollic, thioglycollic, lactic, hydracrylic, malic, thiomalic, oxalic, salicylic, thiosalicylic, p-amino-salicylic, malonic, citric and tartaric acids which comprises heating to 60–70° C. an aqueous medium containing a lower aliphatic carboxylic acid of 2 to 4 carbons, a reducing compound selected from the group consisting of hydroxylamine, hydrazine, and lower alkyl hydrazines in which one of the hydrazine nitrogens is unsubstituted, and ammonium metavanadate, the said organic acid and said reducing compound being present in stoichiometric excess, until evolution of nitrogen has substantially ceased and adding to said reaction mixture, while holding said reaction mixture at a temperature from ambient to 60° C., at least stoichiometric amounts of a base selected from the group consisting of hydroxides and carbonates of alkali metal and $NH_4^+$ cations, which cations become the cations of the salt produced, and an organic complexing acid of the above defined group, and isolating the said water-soluble vanadium (IV) salt.

2. The method of claim 1 in which said isolation of the said vanadium (IV) salt is carried out by the addition of a lower aliphatic alcohol to precipitate the said salt as a fine powder.

3. The method of claim 1 in which the said organic complexing acid is tartaric acid.

4. The method of claim 2 in which the said organic complexing acid is tartaric acid and the said lower aliphatic alcohol is methanol.

5. The method of claim 1 in which the said organic complexing acid is p-aminosalicylic acid.

References Cited in the file of this patent

UNITED STATES PATENTS 2,795,549    Abbott et al. _____ June 11, 1957

OTHER REFERENCES

Sidgwick: "Chemical Elements and Their Compounds," vol. I, Clarendon Press, 1950, pp. 822–823.